(12) United States Patent
Kreider et al.

(10) Patent No.: US 7,577,903 B1
(45) Date of Patent: Aug. 18, 2009

(54) DEFINING A PROCESS BY A PLURALITY OF PAGES DEFINED IN A MARK-UP LANGUAGE

(75) Inventors: Robert E. Kreider, Beavercreek, OH (US); Barbara A. Roy, Miamisburg, OH (US)

(73) Assignee: NCR Corporation, Dayton, OH (US)

( * ) Notice: Subject to any disclaimer, the term of this patent is extended or adjusted under 35 U.S.C. 154(b) by 2054 days.

(21) Appl. No.: 09/704,066

(22) Filed: Nov. 1, 2000

(51) Int. Cl.
*G06F 17/00* (2006.01)

(52) U.S. Cl. ...................................................... 715/234

(58) Field of Classification Search ................. 715/513, 715/517, 530, 234; 700/83
See application file for complete search history.

(56) References Cited

U.S. PATENT DOCUMENTS

| 5,835,914 | A | 11/1998 | Brim | |
|---|---|---|---|---|
| 6,381,507 | B1 * | 4/2002 | Shima et al. | 700/83 |
| 6,556,221 | B1 * | 4/2003 | Shima et al. | 345/764 |

FOREIGN PATENT DOCUMENTS

WO  WO 00/25239  5/2000

OTHER PUBLICATIONS

Chappell D et al: "ACTIVEX Demystified" Byte, McGraw-Hill Inc., vol. 22, No. 9, Sep. 1, 1997, pp. 56-62, 64, XP000726365, St Peterborough, US, ISSN: 0360-5280.

* cited by examiner

*Primary Examiner*—Rachna S Desai
(74) *Attorney, Agent, or Firm*—Gregory A. Welte (57) ABSTRACT

A process is defined by HTML pages (406 to 408) called and executed by a browser control. Operations are implemented via dynamically linked operational objects (441) that are called by a control object (417) and a called object may return an event back to the calling control object (417). The HTML pages are selectively displayed and executed by a controlled browser (407) that is itself controlled by a controlling container object (410). Active control objects (411 to 417) for calling the operational objects (411) are contained within the container object (410). A single passthrough object (431) is created and each of the HTML pages includes a page embedded control object (423). An initiating object within a page calls its embedded object. An initiating embedded object (423) calls the passthrough object (431) and passes to the passthrough object output information detailing a desired call to a specified operational object (441). This passthrough object (431) interprets the output information received from the embedded object (423) and generates a communication to a contained object (414), via a decoder (424) so as to call the desired operational object (441). The pathway object (431) receives event data from a called operational object and returns input data to the initiating embedded object (423) indicative of the returned event.

27 Claims, 8 Drawing Sheets

DEFINING A PROCESS BY A PLURALITY OF PAGES DEFINED IN A MARK-UP LANGUAGE

BACKGROUND OF THE INVENTION

1. Field of the Invention

The present invention relates to performing a process by linking a plurality of pages defined in a mark-up language that are executable by a browser, wherein the process implements operations via dynamically linked operational objects.

2. Description of the Related Art

Mark-up languages, such as hypertext mark-up language (HTML), provide a useful environment for the establishment of sophisticated graphical displays and, as such, are very suitable for inviting input responses from users via a graphical user interface. In addition to displaying graphical entities, it is also possible to embed executable scripts within HTML pages that in turn may include controls for calling dynamically linked objects.

A problem with embedding objects of this type within HTML pages is that active X controls are often relatively large and thereby significantly increase the operational time required for an HTML page to be loaded from storage or to be received via a network or an Internetwork connection. Although this may be acceptable in many environments, there are many other environments, particularly those of a commercial nature, where it is highly undesirable for the time taken for a page to be created to be any larger than necessary.

A further problem exists in that controls are destroyed when a page as a whole is destroyed, usually to enable a new page to be created.

A further problem exists with embedded controls in that the nature of the control itself is readily accessible when contained within an HTML page and under some environments this may be considered undesirable.

A process defined by a plurality of linked HTML pages is illustrated in Figure A. In this example, three HTML pages A1, A2 and A3 are shown although the system could include considerably more. These HTML pages may be read from local storage, received via a network or received via an online connection to an Internet or a dedicated link to a remote host computer. Each is capable of generating graphical information, illustrated by the left region of each page. In addition, each page may contain an embedded script, executable by a browser, illustrated by the right portion of each page. This script may include Active X controls or similar, such as control A4. During the execution of page A1, by browser A5, control A4 is executed, resulting in an instance of a library object being created, as illustrated by arrow A6. The instantiated object will perform a called function and will then return an event, illustrated by arrow A7.

Process flow is achieved by HTML pages, such as page A1, having links to other pages, such as A2, as illustrated by arrow A8. Under the environment shown in Figure A, it is possible for page A1 to call a function and then continue to execute instructions, or respond to user input, before event A7 is received. Part of this subsequent processing may involve the execution of link A8 under the control of the browser A5. Under these circumstances, browser A5 will close object A1 and instantiate HTML page A2. If the event A7 now returns, it has nowhere to return to and is thereby effectively lost.

Browser control B5 provides functionality of a conventional browser but in an embedded form. Consequently, a program is required in order to control the browser control and this is achieved by the establishment of a browser container A9. In addition to controlling browser control A5, container A9 is also tasked with ensuring that reliable operation of the browser control is maintained and, where necessary, reloading the browser control so as to restart the operation. In this way, the overall application is maintained and it is not necessary to rely upon the default crisis management provisions of the operating system, or on manual intervention from a user.

The instantiation of an HTML page into system memory takes a longer period of time when an HTML page contains many Active X controls, such as control A4. It would therefore be desirable to initialize these strongly typed controls during an initialization procedure, prior to the loading and processing of the HTML page. However, a problem exists in that a returning event, such as event A7, must be returned to the originating page in order for the original calling process to be satisfied.

Under the environment shown in Figure A, a systems developer may be under some pressure to reduce the number of Active X controls embedded within HTML pages in order to ensure that the time taken to load a page is not excessive. Furthermore, a developer may also be placed under further constraints so as to minimize the chance of an event being returned to an HTML page after that HTML page has been closed down and a new page has been established. It may also be desirable to reduce the amount of script contained on HTML pages so as to make it less accessible to third parties.

BRIEF SUMMARY OF THE INVENTION

According to an aspect of the present invention, there is provided data processing apparatus having processing means, memory means and display means. The processing means performs a process in response to program instructions read from the memory means via dynamically linked operational objects called by control objects, such that events are returned back to a calling control object. A plurality of pages are defined in a mark-up language that are selectively displayed and executed by a controlled browser. The controlled browser is controlled by a controlling container object and active control objects for calling said operational objects are contained within the container object. A single pass-through object is created and at least one of the pages includes a page embedded control object configured to call the pass-through object. On initiating one of the page embedded objects calls the pass-through object and passes to the pass-through object output information detailing a desired call to a specific operational object. The pass-through object interprets output information received from a page embedded object to generate a call to a contained object that in turn calls the desired operational object. The pass-through object receives event data from a called operational object and returns input data to the initiating embedded object indicative of the returned event.

In a preferred embodiment, any process configured to create a pass-through object will firstly ensure that such an object is not in existence and only create the object if it is not in existence thereby ensuring that only one pass-through object exists at any one time.

Preferably, the call to a contained object is made via a specific decoding object within the container.

In a preferred embodiment, the return events are returned to an initiating page via the pass-through object. The pass-through object may maintain a register of established pages and may also contain a buffer for buffering events to be returned to the pages that are no longer established within the process. Preferably, buffered events are returned to non-established pages after said pages have been re-established.

BRIEF DESCRIPTION OF THE SEVERAL
VIEWS OF THE DRAWINGS

Figure A illustrates a process flow achieved by linked HTML pages of the prior art.

BEST MODE FOR CARRYING OUT THE
INVENTION

Figure 1:
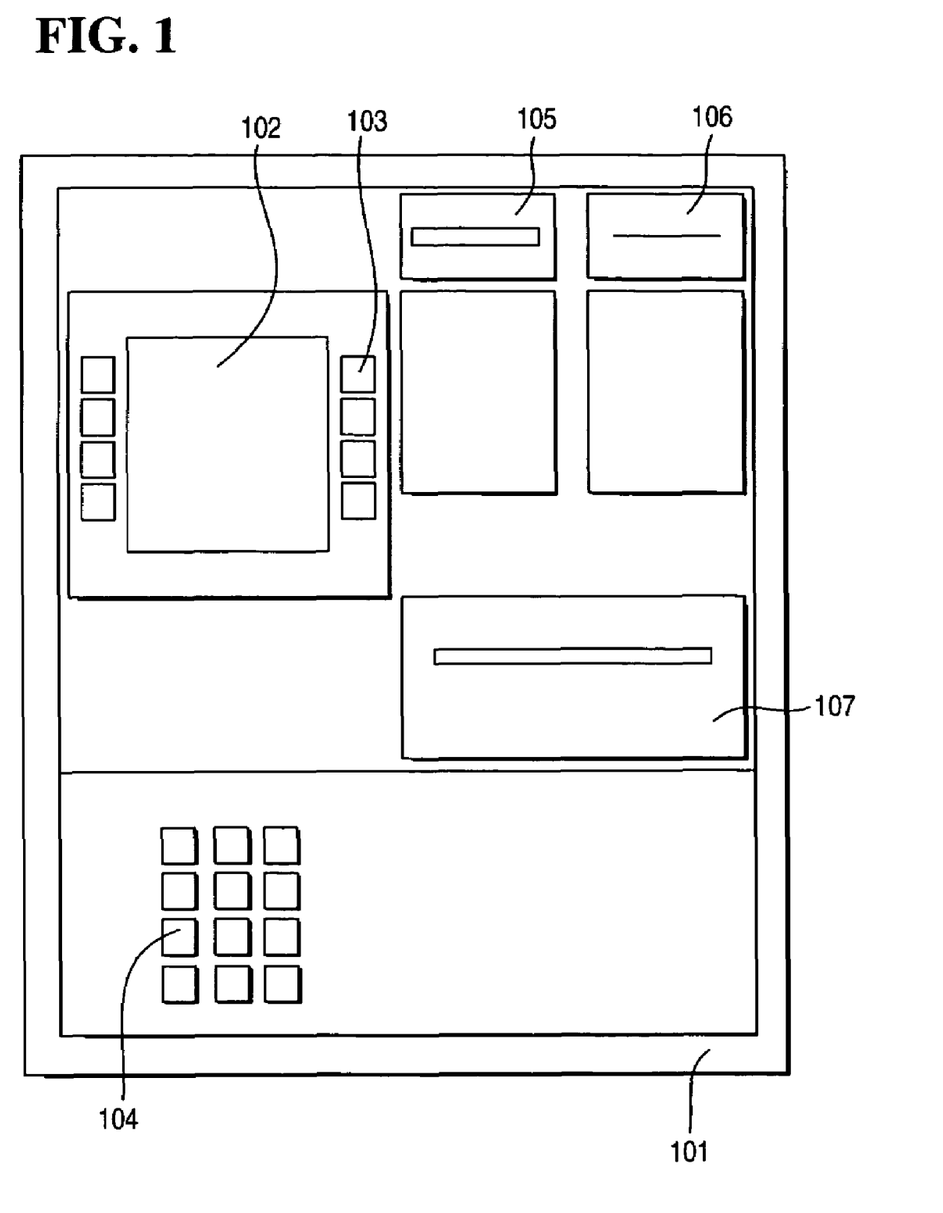
FIG. 1 illustrates an environment for the exploitation of the present invention.

An environment that exploits hypertext mark-up language (HTML) pages for the display of graphical information is identified in FIG. 1. In this example, the pages are embedded within a cash dispenser, often referred to as an automatic teller machine (ATM). This represents an example of a wider class of devices for the remote servicing of customers that may be more generically referred to as self service terminals. However, the present invention is not limited to applications of this type and may be exploited in any environment where a process defined by a plurality of HTML (or other mark-up languages such as XML etc) are being used to define a process that in turn implements operations via dynamically linked operational objects.

The self service terminal (SST) 101 shown in FIG. 1 includes a graphical display 102, such as a cathode ray tube (CRT) visual display unit, a liquid crystal display (LCD) unit or similar. The display 102 preferably conforms to SVGA standards and is capable of displaying basic text, animated text or full motion video. The visual display unit 102 often displays menus from which selections may be made via soft keys 103, of which four are positioned to the left of the visual display 102 with a similar collection of four being displaced to the right of the VDU 102.

The terminal 101 includes keypad 104, primarily provided to allow customers to enter personal identification numbers and to specify any currency amounts that may not be available from displayed menu selections. A customer's transaction card is received within a card reader 105, transaction slips, detailing the nature of a transaction or identifying balances etc are printed by means of a slip printer 106 and currency is dispensed via a cash dispenser 107.

Figure 2:
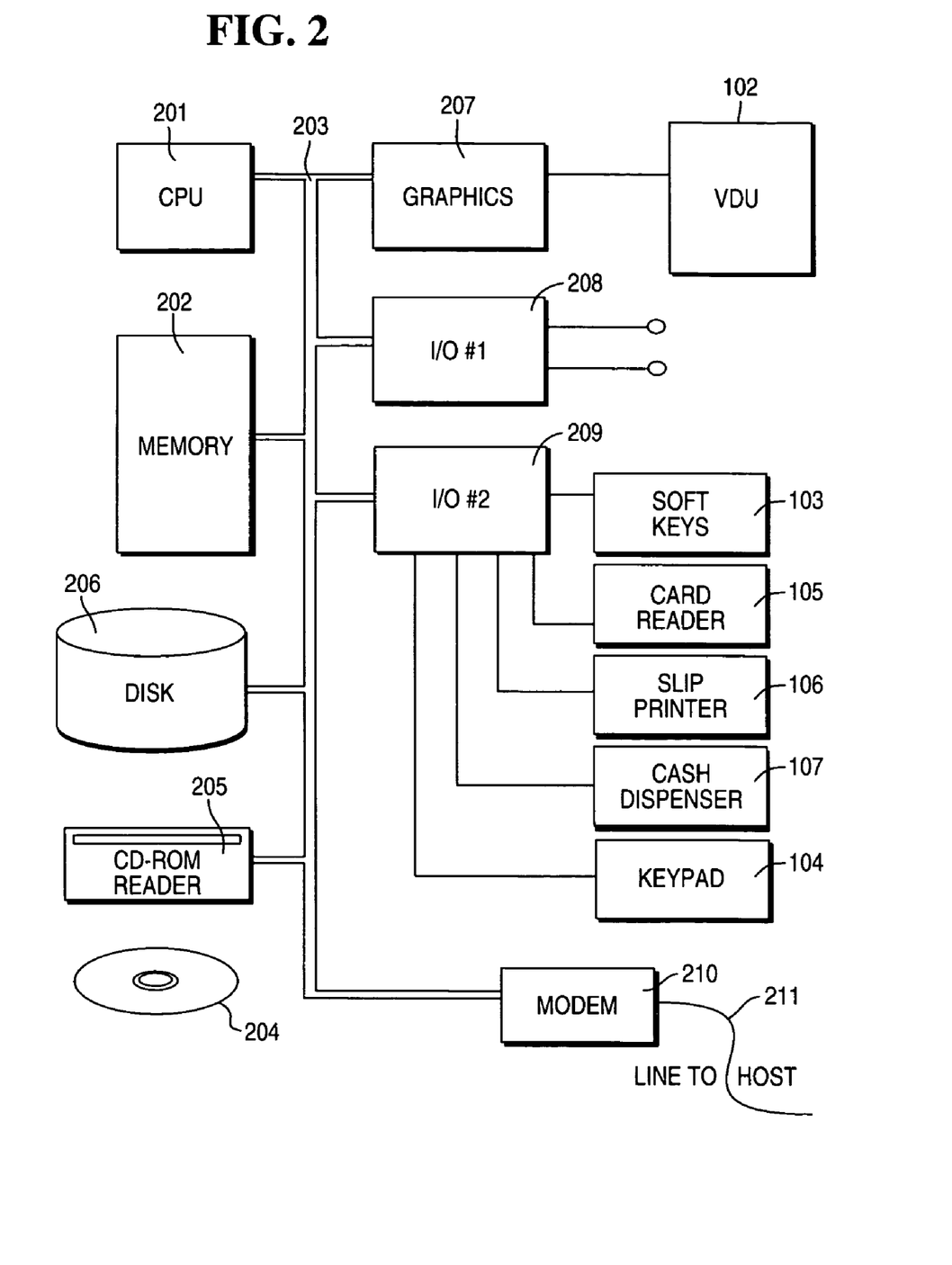
FIG. 2 illustrates internal hardware structure of the environment illustrated in FIG. 1.

The internal structure of terminal 101 is shown schematically in FIG. 2. The system operates under the control of a Pentium III central processing unit 201 connection to one hundred and twenty-eight megabytes of system memory 202 via a communications bus 203. New program instructions are conveyed by a CD ROM 204 receivable within a CD ROM reader 205. During an installation process, program instructions are written to a resident hard disk drive 206. These instructions include HTML pages with linking scripts, other object programs loaded during initialization and a plurality of dynamically linkable objects contained within a library held on disk 206. Other mechanisms may be deployed for the installation of program instructions, such as a network connection, an Internet connection or a direct connection to a remote host computer.

Graphical images are conveyed to visual display unit 102 via a graphics card 207. A conventional interface device 208 allows connections to a conventional mouse and keyboard, although these are not required for the remote embedded application of the system. A dedicated interface device 209 facilitates the reception of data from soft keys 103, the reception of data from card reader 105, the supply of information to slip printer 106, the control of cash dispenser 107 and the reception of data from keypad 104. Communication with a remote host computer is achieved via a modem 210 connected to a telecommunications line to said host computer 211, or via a dedicated communications link.

Communication between the devices shown in FIG. 2 is established under the operating system Windows NT. When power is applied to the system, Windows NT loads, followed by the loading of an application program in order to provide the embedded and remote functionality. Objects are initialized within the system to the point where a steady state is reached where the machine is effectively waiting for a new transaction to be initiated. A transaction is initiated by a card being inserted within card reader 105 which, if authorized, will then result in an interactive session being initiated.

During the interactive session, graphical displays are presented to a user on VDU 102 and the graphical information is generated from respective HTML pages. These HTML pages are linked such that it is possible to move from one page to another after particular conditions have been satisfied. In this way, it is possible to define an overall customer flow that may in turn establish flows involving dynamically linked objects for particular transactions.

Figure 3:
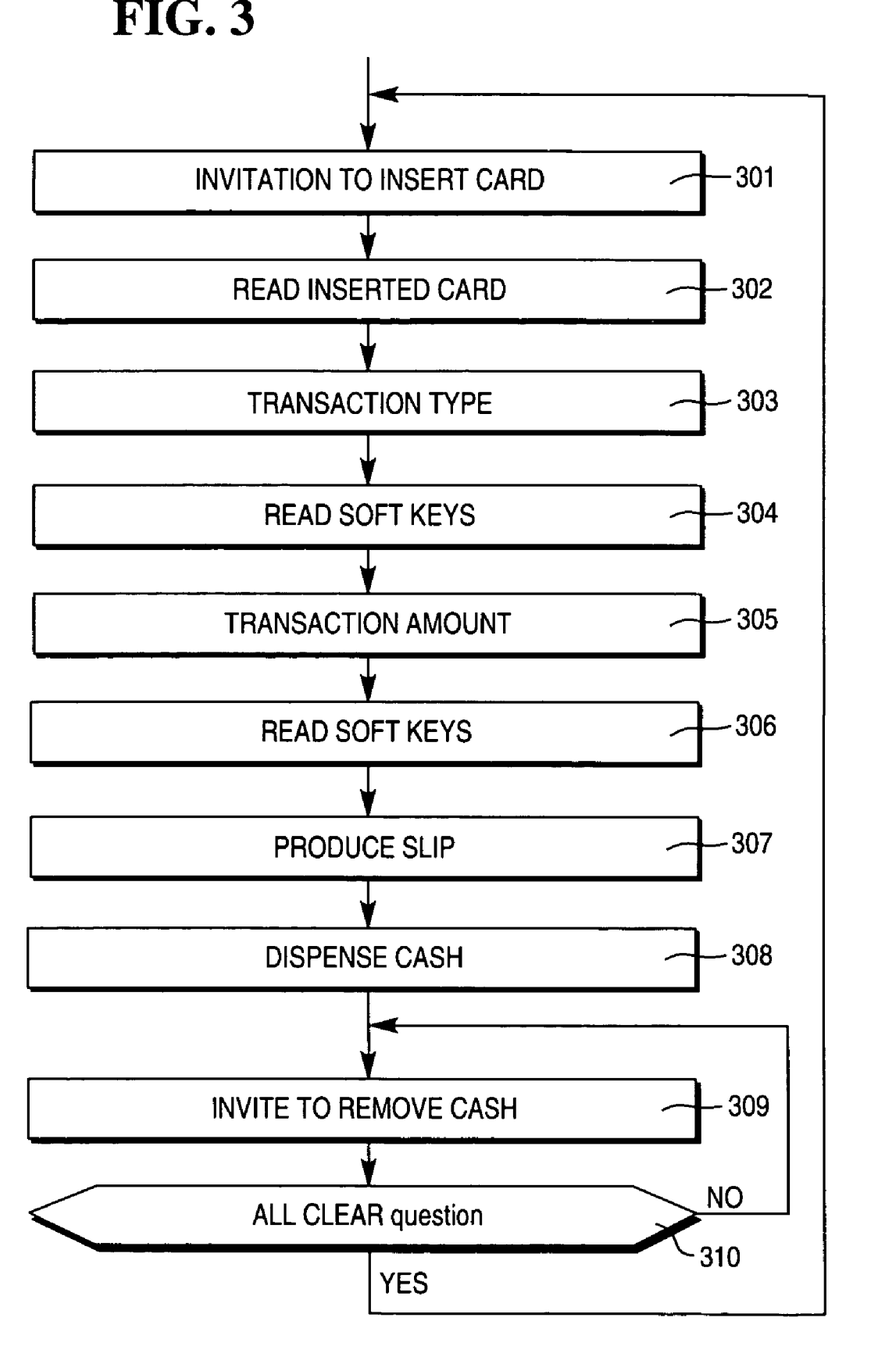
FIG. 3 shows an example of a customer session performed within the environment shown in FIG. 1.

An example of a customer session is illustrated in FIG. 3. At step 301 an HTML page supplies graphics to VDU 102 inviting a customer to insert a card. In response to a card being inserted, the card is read at step 302, whereafter a new HTML page is called at step 303 in order to invite a customer to define a transaction type. At step 304, soft keys 103 are interrogated whereafter an appropriate new HTML page is called to display information relevant to the type of transaction defined by the operation of the keys at step 304. Thus, it can be appreciated that, at this point the flow could branch in many directions and the process shown in FIG. 3 is merely a single example of this.

In the example shown in FIG. 3, a customer has elected to withdraw currency and at step 305 a customer is invited to define a transaction amount. Soft keys 103 are interrogated again at step 306 thereby instructing the terminal as to the quantity of currency required by the customer.

At step 307 a slip is printed by means of slip printer 106 and at step 308 cash is dispensed by operation of cash dispenser 107.

A new HTML page is generated at step 309 inviting the customer to remove dispensed cash and a question is then asked at step 301 to check that all is now clear, i.e. that the cash has been removed and therefore the session has been completed. If answered in the negative, further invitations are made to the customer to remove cash and eventually the question asked at step 310 will be answered in the affirmative, allowing control to be returned to step 301.

Figure 4:
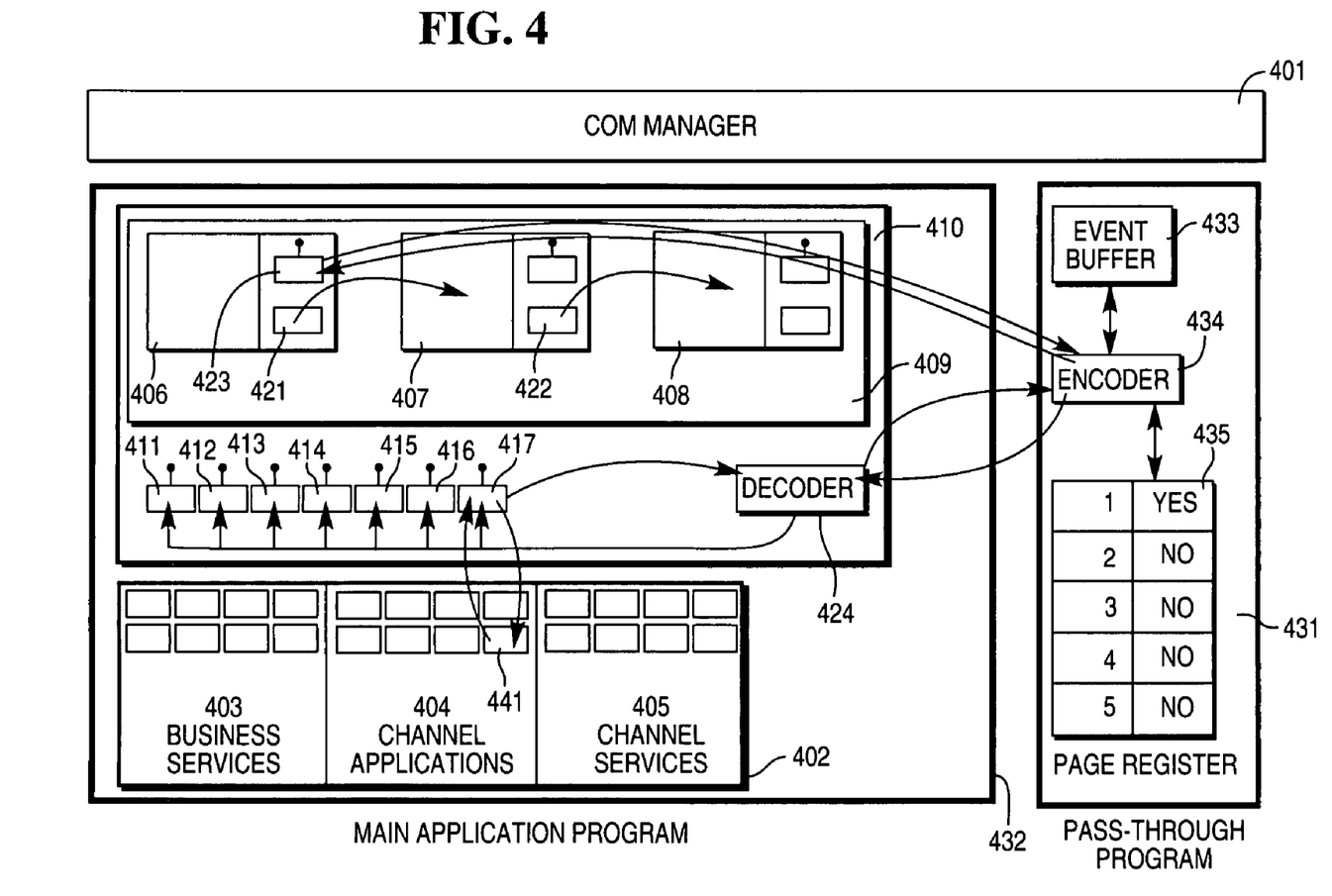
FIG. 4 illustrates a software environment executable within the environment shown in FIG. 1 to perform a procedure of the type shown in FIG. 3.

The software environment in which the procedures identified in FIG. 3 are effected are illustrated in FIG. 4. The procedures will operate within the Windows NT operating system, thereby providing a communications manager 401 for in process and out process communications between objects. A dynamically linked library 402 is provided, having library objects with functions therein that have been grouped into three functional types, consisting of business services 403, channel applications 404 and channel services 405.

The channel services functions 405 provide abstracted interfaces for devices within the terminal itself. They include what may be considered as device drivers for devices such as the card reader 105 and the cash dispenser 107 etc. Functions coming under the category of business services 403 are concerned with interactions of the host computer via modem 210 on line 211. These include account services that identify the types of accounts held by customers and provide information relating to customer balances, consumer interfaces that provide information about particular customers such as their age and their financial status and card functions that consider aspects of processing details contained on cards and in particular customer acceptance in order to allow a session to be initiated.

Channel applications provide the essential core to the operations provided by the terminal and are called dynamically when a session is taking place. These calls are instigated by linked HTML pages, such as pages 406, 407 and 408. In FIG. 4, these three pages are shown simultaneously for illustrative purposes. In the actual implementation, these pages are created sequentially and are supported by a browser control 409. The browser control 409 is embedded within a container program 410, providing the functionality of container A9 described with respect to Figure A. However, in Figure A, Active X controls were embedded within the HTML pages. In this embodiment, Active X controls 411, 412, 413, 414, 415, 416 and 417 are embedded within the container program 410.

Each HTML page 406 to 408 includes script to allow a first HTML page to be linked to a second HTML page. Thus, for example, HTML page 406 includes script 421 that, when appropriate conditions are met, will result in HTML page 406 being closed and HTML page 407 being established. Similarly, script 422 in HTML page 407 will, under appropriate conditions, cause HTML page 407 to be closed down and HTML page 408 to be loaded.

Each HTML page 406 to 408 includes an embedded control 423 that is effectively an agent configured to provide a means of communication to Active X controls contained within the container and as such, it may be referred to as a "container agent".

In addition to having Active X controls 411 to 417, the container also includes a communication decoder 424 configured to effectively receive calls from page embedded controls 423 and decode this information so as to generate an appropriate function call to one of the embedded Active X controls 411 to 417. Thus, decoder 424 is an agent responsive to commands received from the HTML pages and as such may be referred to as a "page agent".

Communication between the container agents 423 and the page agent 424 is effected via an independent pass-through program 431 that is executed within the multitasking environment of the operating system. Thus, all of the functionality previously described may be considered as operating within its own individual main application program 432 and communication between these two separate processes is established through the communications manager 401.

Pass-through program 431 includes an event buffer 433, an encoder 434 and a page register 435. Page embedded controls (the container agents) make conventional calls to encoder 434 of the pass-through program 431. Encoder 434 encodes this information in order to make a method call to decoder 424 (the page agent) embedded within the container 410. Method calls are decoded by decoder 424 to generate conventional function calls to the Active X controls 411 to 417. These in turn create events to be passed back to the calling Active X control. In turn, the controls pass the information back to the decoder 424 which now performs an encoding process to return the event information, in the form of a method call, back to the encoder 434. In terms of receiving this event information, the encoder 434 now effectively provides a decoding process such that the event may be returned to the initiating page.

Before encoder 434 returns event information, its page register 435 is interrogated. The page register 435 maintains a record of active pages. If the originating page is active, the encoder returns the event to that page. Alternatively, if for some reason the page is no longer active, the event information is held within an event buffer 433. The event information remains in the event buffer 433 until the originating page becomes re-registered, as recorded by the page register 435, whereupon the event information may then be returned to that initiating page.

To summarize, a process is defined by a plurality of HTML pages 406 to 408, called and executed by a browser control 409. Operations are implemented via dynamically linked operational objects 441. In the example shown in FIG. 4, Active X control 417 calls object 441, that will in turn return an event back to the calling control object 417.

The HTML pages are selectively displayed and executed by a controlled browser 409, that is itself controlled by a controlling container object 410. Active control objects 411 to 417, for calling the operational objects (411), are contained within the container object 410. A single passthrough object, which in this example is an independent program 431, is created. Each of the HTML pages 406 to 408 includes a page embedded control object, a singular object that has also been referred to as an embedded control object (container agent). An initiating object within a page calls the passthrough object 431 and passes to the passthrough object output information detailing a desired call to a specified operational object 441.

The passthrough object 431 interprets the output information received from the embedded object 423 to generate a communication to a contained object 417, via the decoder (page agent) 424 so as to call the desired operational object from 441. The passthrough object 431 receives event data from a called operational object and returns input data to the initiating embedded object 423 indicative of the returned event.

Figure 5:
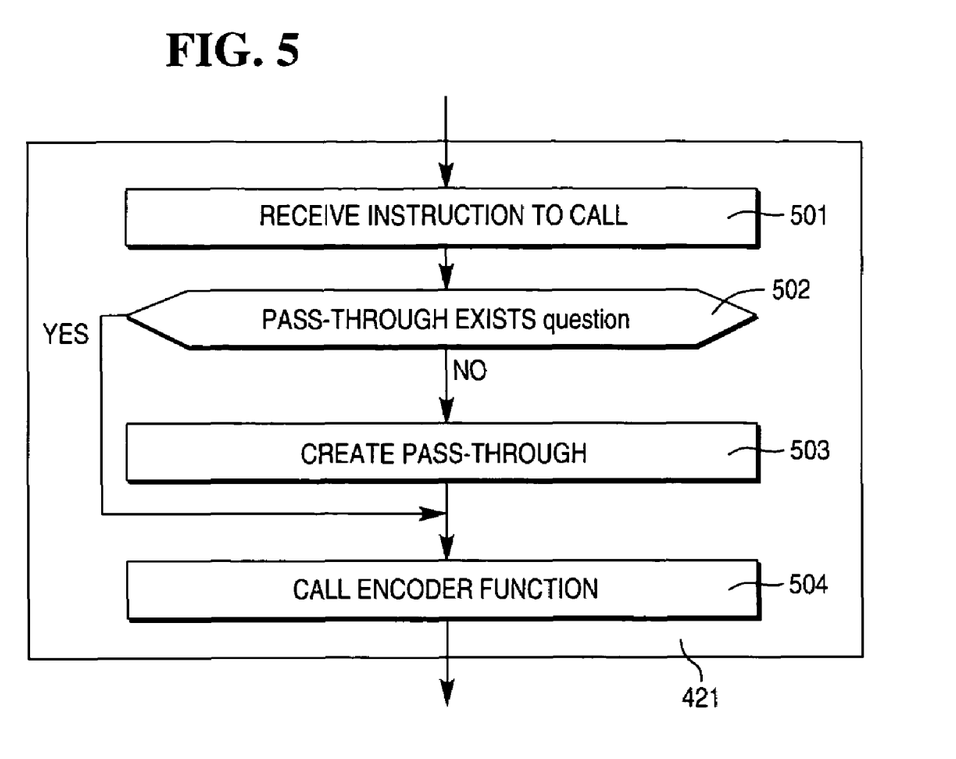
FIG. 5 details operations performed by page embedded controls of the type identified in FIG. 4.

Operations performed by the page embedded controls 423 (container agents) are detailed in FIG. 5. At step 501 an instruction is received to the effect that a call is to be made to the passthrough and at step 502 a question is asked as to whether the passthrough already exists. If this question is answered in the negative, to the effect that no pass-through has presently been instantiated, a passthrough is created at step 503. Alternatively, if the passthrough program is already under execution as a separate process, the question asked at step 502 is answered in the affirmative and control is directed to step 504. Thus, it should be appreciated that these procedures ensure that it is only possible to have one passthrough program under execution.

At step 504 the encoder function 434 is called which will then ultimately result in the object of interest being called. This in turn may result in an event being returned back. Consequently, the container agent 423 includes procedures for acting upon a returning event.

Figure 6:
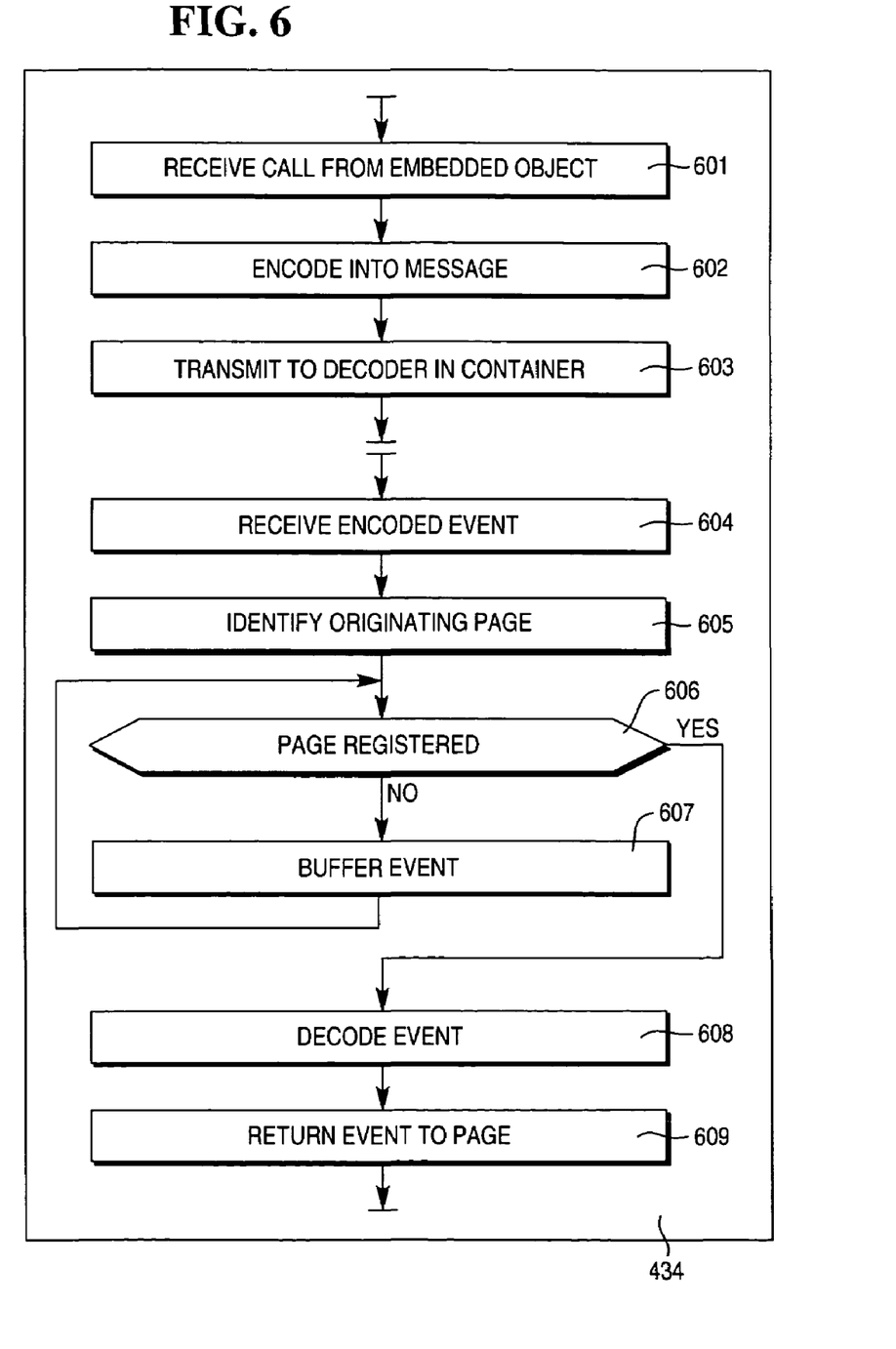
FIG. 6 illustrates procedures performed by an encoder function identified in FIG. 4.

Procedures performed by the encoder function 434 are detailed in FIG. 6. At step 601 a function call is received from a page embedded object control 423, i.e. from a container agent. At step 602, details of the call are encoded into a message, whereafter at step 603 a method call is made to decoder 424, i.e. the page agent resident within the container.

Within the container, an appropriate call will be reconstituted in order to call a channel application object and the event returned to decoder 424 whereupon this is again encoded into a method call.

At step 604 the method call, that is an encoded version of the event, is received and at step 605 the originating page is identified.

At step 606 a question is asked as to whether the page has been registered by interrogating page register 435 and if this question is answered in the negative, control is directed to step 607, whereupon the event is buffered in event buffer 433.

When a page is reestablished, it then becomes possible for the question asked at step 606 to be answered in the affirmative resulting in control being directed to step 608. At step 608 the event is decoded and returned as such at step 609 to the originating page.

Referring to FIG. 3, after a transaction type has been selected at step 304, steps 30b to 308 relate to the actual cash withdrawal process. An amount is specified by a user and in response to this amount being specified a slip is produced and cash is dispensed. Within the environment shown in FIG. 4, this dispensing of cash process is performed under the control of channel application object 441. The procedures involved in order to call this object are summarized in FIG. 7.

Initially, a user is presented with an HTML page requesting information concerning the transaction amount, as identified at 305 at FIG. 3. The script within HTML page 406 is designed to implement the procedures shown in FIG. 3 by making a call to the withdrawal transaction object 441. This consists of a first call 701 taking the form:

SET PROPERTY ("WDL", "AMOUNT", "100")

This is then followed by a call 702 to execute the method, taking the form:

EXECUTE METHOD ("WDL", "EXECUTE")

Figure 7:
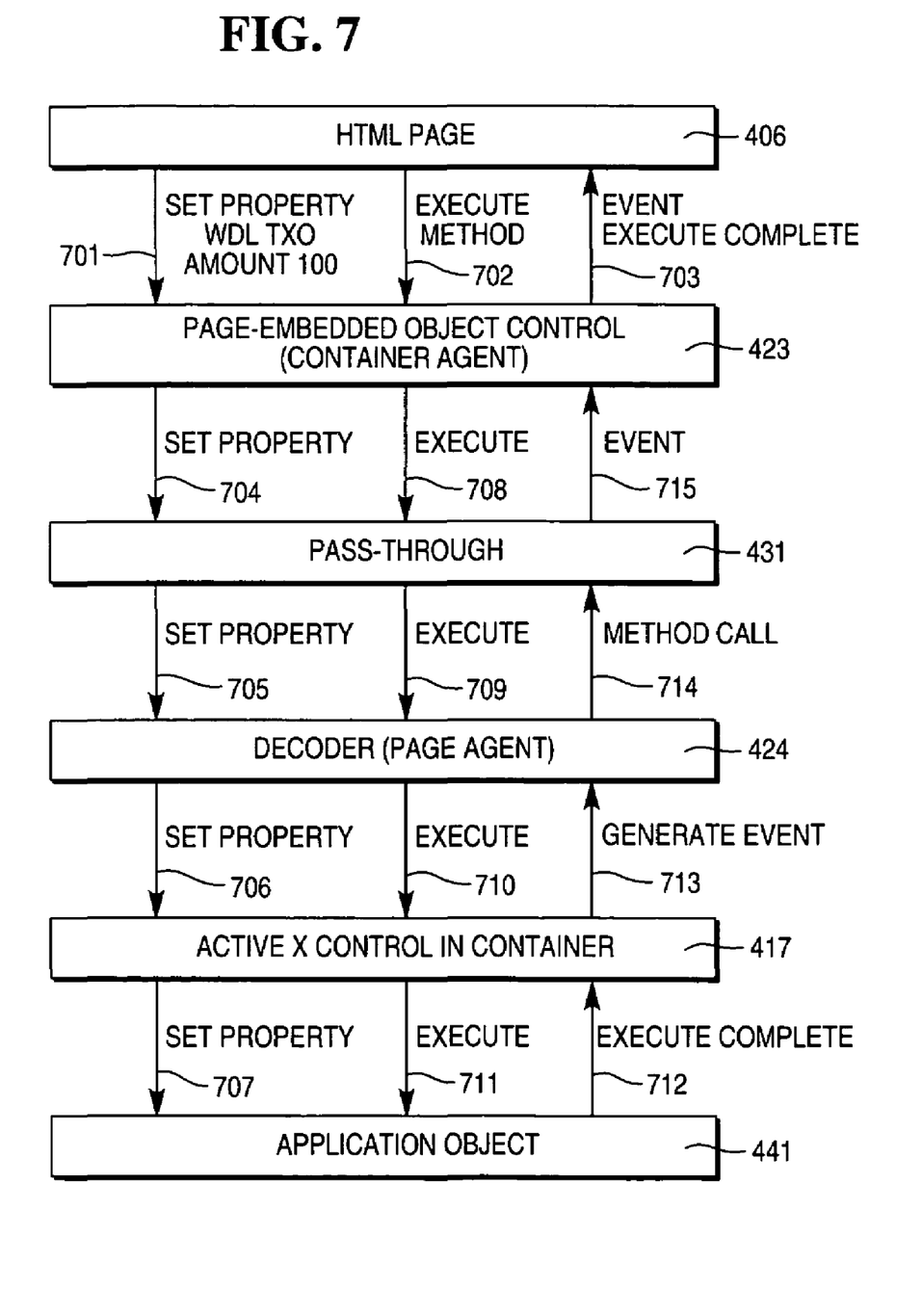
FIG. 7 illustrates a flow of information between an HTML page and an application object.

After completing the withdrawal transaction, an event 703 is returned to the HTML page 406 to the effect that the execution has completed.

Call 701 made by the HTML page 406 is directed towards its embedded object 423. The embedded object 423 makes a method call 704 to the passthrough 431 which encodes this call for transmission 705 to the decoder (page agent) 424. A conventional call 706 is then made by the decoder 424 to the appropriate Active X control 417. Active X control 417 then establishes a call 707 to the application object 441.

A similar progression is made from the HTML page 406 in order to execute the method. Thus, the instruction to execute is communicated at 708 from the container object 423 embedded within the page to the passthrough object 431. Method call 709 is the made from the passthrough object 431 to the decoder page agent 424 that in turn makes a call 710 to the Active X control 417 that in turn makes a call 711 to the application object 441.

When the application object 441 generates an execution complete event, this is submitted as event 712 to the Active X control 417 present in the container. This event is then submitted at 713 to the decoder page agent 424 that in turn generates a method call 714 to the passthrough 431. At the passthrough encoder 434, the event is reconstituted and submitted at 715 to the page embedded control object 423. This is then conveyed at 703 to the HTML page.

The present invention allows a process to be defined by a plurality of pages defined in a mark-up language such that they may be executed by a browser. The pages have executable scripts including Active X controls. The browser is contained within a container and Active X controls to external applications are placed in this container in preference to being placed in the HTML pages themselves. In this way, it is possible for these controls to be initialized upon start-up in preference to being initialized each time an HTML page is instantiated.

A single passthrough is established that keeps track of the actual pages that are in existence. In addition, when events are returned, these events are only conveyed back to an initiating page if the page is still in existence and is therefore recorded as such in the register. If such a record does not exist, the event is buffered until the page is reestablished. In this way, events are not lost if an initiating page is closed down and then reestablished later. The passthrough therefore provides a means of communicating between the HTML pages and controls existing within a container or a browser control. Furthermore, the nature of the passthrough ensures that events are not lost, thereby enhancing the availability of procedures that may be deployed by a developer because the passthrough program will ensure that events are not lost when new pages are loaded. Furthermore, the overhead of loading pages is significantly reduced in terms of their time of loading whereas their functionality is significantly enhanced by initializing object controls upon start-up in preference to the controls being established within the pages themselves.

What is claimed is:

1. Data processing apparatus having processing means, memory means and display means, wherein
    said processing means performs a process in response to program instructions read from said memory means via dynamically linked operational objects called by control objects, such that events are returned back to a calling control object;
    a plurality of pages are defined in a mark-up language that are selectively displayed and executed by a controlled browser;
    said controlled browser is controlled by a controlling container object;
    active control objects for calling said operational objects are contained within said container object;
    a single pass-through object is created;
    at least one of said pages includes a page embedded control object configured to call said passthrough object;
    an initiating one of said page embedded objects calls said passthrough object and passes to said passthrough object output information detailing a desired call to a specified operational object;
    said passthrough object interprets output information received from a page embedded object to generate a call to a contained object that in turn calls the desired operational object; and
    said passthrough object receives event data from a called operational object and returns input data to said initiating embedded object indicative of said returned event.

2. Apparatus according to claim 1, configured as a self service terminal.

3. Apparatus according to claim 2, wherein said self service terminal dispenses money and facilitates financial transactions.

4. Apparatus according to claim 1, wherein said mark-up language is hypertext mark-up language (HTML).

5. Apparatus according to claim 1, wherein said passthrough object is a separate process executed under the control of an operating system.

6. Apparatus according to claim 5, wherein any process configured to create a passthrough object will firstly ensure that such an object is not in existence and only create the object if it is not in existence thereby ensuring that only one passthrough object exists at any one time.

7. Apparatus according to claim 1, wherein said call to a contained object is made via a specific decoding object within said container object.

8. Apparatus according to claim 1, wherein return events are returned to an initiating page via said passthrough object.

9. Apparatus according to claim 8, wherein said passthrough object maintains a register of established pages.

10. Apparatus according to claim 9, wherein said passthrough object includes a buffer for buffering events to be returned to pages that are no long established within the process.

11. Apparatus according to claim 10, wherein buffered events are returned to non-established pages after said pages have been re-established.

12. A method of defining a process in a computer system via a plurality of pages defined in a mark-up language that are executable by a browser, in which said process implements operations via dynamically linked operational objects called by control objects such that events are returned back to a calling control object;

a plurality of pages defined in a mark-up language are selectively displayed and executed by a controlled browser;

said controlled browser is controlled by a controlling container object;

active control objects for controlling said operational objects are contained within said container object;

a single passthrough object is created; and pages include a page embedded control object configured to call said passthrough object, said method comprising the steps of:

on a computer, calling said passthrough object from an initiating embedded object and passing output information detailing a desired call to a specified operational object;

on the computer, interpreting said output information at said passthrough object to effect a call to said operational object; and on the computer, returning input data to an initiating embedded object indicative of a returned event via said passthrough object.

13. A method according to claim 12, wherein said mark-up language is hypertext mark-up language (HTML).

14. A method according to claim 12, wherein said passthrough object is a separate process executed under the control of an operating system.

15. A method according to claim 14, wherein any process configured to create a passthrough object will firstly ensure that such an object is not in existence and only create the object if it is not in existence thereby ensuring that only one passthrough object exists at any one time.

16. A method according to claim 12, wherein said call to a contained object is made via a specific decoding object within the container.

17. A method according to claim 12, wherein return events are returned to an initiating page via said passthrough object.

18. A method according to claim 17, wherein said passthrough object maintains a register of established pages.

19. A method according to claim 18, wherein said passthrough includes a buffer for buffering events to be returned to pages that are no longer established within the process.

20. A method according to claim 19, wherein buffered events are returned to non-established pages after said pages have been re-established.

21. A memory having computer-readable instructions executable by a computer such that, when executing said instructions, said computer will perform the steps of:

establishing a library of dynamically linkable objects that may be called by control objects such that events are returned back to a calling control object;

establishing the availability of a plurality of pages defined in a mark-up language that may be selectively displayed and executed by a controlled browser, wherein said controlled browser is controlled by a controlling container object;

containing active control objects for controlling operational objects within said container object; and facilitating the establishment of a single passthrough object, wherein pages defined in said mark-up language include a page embedded control object configured to call said passthrough objects such that, during a session with a user, said program computer will perform the steps of:

calling said passthrough object from an initiating embedded object and passing output information detailing a desired call to a specified operational object;

interpreting said output information at said passthrough object to effect a call to said operational object; and returning input data to an initiating embedded object indicative of a returned event via said passthrough object.

22. A memory having computer-readable instructions according to claim 21, such that when executing instructions, said computer will execute a process configured to create a passthrough object, wherein said process will firstly ensure that such an object is not in existence and only create the object if it is not in existence thereby ensuring that only one passthrough object exists at any one time.

23. A memory having computer-readable instructions according to claim 21, such that when executing instructions, said computer will make a call to a contained object, wherein this call is made via a specific decoding object within a container.

24. A memory, having computer-readable instructions according to claim 21, such that when executing instructions, a computer will return events to an initiating page via said passthrough object.

25. A memory having computer-readable instructions according to claim 24, such that when executing instructions, said computer will ensure that said passthrough object maintains a register of established pages.

26. A memory having computer-readable instructions according to claim 25, such that when executing instructions, a computer will ensure that said passthrough object includes a buffer for buffering events to be returned to pages that are not longer established within the process.

27. A memory having computer-readable instructions according to claim 26, such that when executing instructions, a computer will ensure that buffered events are returned to non-established pages after said pages have been re-established.

* * * * *